US008255365B2

(12) United States Patent
Zeis et al.

(10) Patent No.: US 8,255,365 B2
(45) Date of Patent: Aug. 28, 2012

(54) SOURCE CLASSIFICATION FOR PERFORMING DEDUPLICATION IN A BACKUP OPERATION

(75) Inventors: Mike Zeis, Minneapolis, MN (US); Weibao Wu, Vadnais Heights, MN (US)

(73) Assignee: Symantec Corporation, Mountain View, CA (US)

( * ) Notice: Subject to any disclaimer, the term of this patent is extended or adjusted under 35 U.S.C. 154(b) by 365 days.

(21) Appl. No.: 12/480,587

(22) Filed: Jun. 8, 2009

(65) Prior Publication Data
US 2010/0312752 A1 Dec. 9, 2010

(51) Int. Cl.
*G06F 17/00* (2006.01)
(52) U.S. Cl. .......................... 707/640; 707/694; 707/698
(58) Field of Classification Search .................. 707/646, 707/653, 654, 673, 640, 644, 661, 698, 694
See application file for complete search history.

(56) References Cited

U.S. PATENT DOCUMENTS

| | | | |
|---|---|---|---|
| 5,873,101 A * | 2/1999 | Klein | 707/640 |
| 6,453,325 B1 * | 9/2002 | Cabrera et al. | 1/1 |
| 7,024,390 B1 * | 4/2006 | Mori et al. | 705/41 |
| 2005/0223043 A1 * | 10/2005 | Randal et al. | 707/200 |
| 2005/0223277 A1 * | 10/2005 | Ballard | 714/15 |
| 2006/0212462 A1 * | 9/2006 | Heller et al. | 707/101 |
| 2006/0230079 A1 * | 10/2006 | Strahl et al. | 707/203 |
| 2006/0253731 A1 * | 11/2006 | Petruzzo | 714/6 |
| 2007/0027937 A1 * | 2/2007 | McGrattan et al. | 707/204 |
| 2007/0174325 A1 * | 7/2007 | Mooney et al. | 707/102 |
| 2007/0239945 A1 * | 10/2007 | Li et al. | 711/154 |
| 2007/0250671 A1 * | 10/2007 | Lyon | 711/162 |
| 2008/0034021 A1 * | 2/2008 | De Spiegeleer | 707/204 |
| 2008/0133835 A1 * | 6/2008 | Zhu et al. | 711/118 |
| 2008/0183767 A1 * | 7/2008 | Zhu et al. | 707/200 |
| 2009/0055590 A1 * | 2/2009 | Takahashi | 711/119 |
| 2009/0234892 A1 * | 9/2009 | Anglin et al. | 707/201 |
| 2010/0030754 A1 * | 2/2010 | Petruzzo | 707/3 |
| 2010/0250858 A1 * | 9/2010 | Cremelie et al. | 711/136 |
| 2011/0125720 A1 * | 5/2011 | Jayaraman | 707/692 |

FOREIGN PATENT DOCUMENTS

WO WO 2004066079 * 8/2004
(Continued)

OTHER PUBLICATIONS

S. Nakamura et al. "Optimal backup policy for a database system with incremental and full backups", Mathematical and computer modelling 38 (2003) 1373-1379.*

(Continued)

Primary Examiner — Srirama Channavajjala
(74) Attorney, Agent, or Firm — Fenwick & West LLP (57) ABSTRACT

A system, method, and computer program product for backing up data from a backup source to a central repository using deduplication, where the data comprises source data segments is disclosed. A fingerprint cache comprising fingerprints of data segments stored in the central repository is received, where the data segments were previously backed up from the backup source. Source data fingerprints comprising fingerprints (e.g., hash values) of the source data segments are generated. The source data fingerprints are compared to the fingerprints in the fingerprint cache. The source data segments corresponding to fingerprints not in the fingerprint cache may not be currently stored in the central repository. After further queries to the central repository, one or more of the source data segments are sent to the central repository for storage responsive to comparison.

11 Claims, 6 Drawing Sheets

FOREIGN PATENT DOCUMENTS

| WO | WO 2005069783 | * | 8/2005 |
|---|---|---|---|
| WO | WO 2005/114420 A2 | | 12/2005 |

OTHER PUBLICATIONS

"Lortu Software Announces the Release of Software Components for Implementing Deduplication, Wafs and Wan Optimization Products," Print Press Release, Lortu Software, S.L., Dec. 18, 2006, 3 pages, [Online] [Retrieved on Jan. 22, 2010] Retrieved from the Internet<URL:http://www.1888pressrelease.com/print_pr.php?id=s1d799uw05>.

Waterhouse, S., "The Backup Blog; DL3D: The Benefits of Immediate Deduplication," Nov. 5, 2008, 4 pages, [Online] [Retrieved on Jan. 21, 2010] Retrieved from the Internet<URL:http://thebackupblog.typepad.com/thebackupblog/2008/11/dl3d-the-benefits-of-immediate-deduplication.html>.

Yu, X., Abstract of "Distributed Cache Updating for the Dynamic Source Routing Protocol," Jun. 2006, Appears in: IEEE Transactions on Mobile Computing, vol. 5, Issue 6, 1 page, [Online] [Retrieved on Jan. 21, 2010] Retrieved from the Internet<URL:http://ieeexplore.ieee.org/search/freesrchabstract.jsp?arnumber=1624335&isnumber=34098&punumber=7755&k2dockey=1624335@ieeejrns&query=%281624335%29%3Cin%3Emetadata&pos=0>.

PCT International Search Report and Written Opinion, PCT/US2010/036260, Aug. 25, 2010, 11 pages.

* cited by examiner

SOURCE CLASSIFICATION FOR PERFORMING DEDUPLICATION IN A BACKUP OPERATION

BACKGROUND

1. Field of the Invention

This invention pertains in general to backing up digital data.

2. Description of the Related Art

In an environment including several client computers, such as a corporate local area network (LAN), a centralized backup system is often employed. The centralized backup system is configured by a system administrator to automatically back up data on the storage devices of the client computers. The centralized backup system may include a backup server that periodically performs backups of each of the client computers by copying data segments (e.g. files or portions of files) from the storage devices of the client computers to a central repository. This central repository has a sufficiently large storage capacity and is often located far from the backup server (and client computers). As a result, data segments to be backed up often need to be transmitted over a significant distance through a possibly limited bandwidth link.

One technique of reducing the amount of data transmitted to and stored in the central repository is referred to as "deduplication." A backup system employing deduplication takes advantage of the fact that a data segment found on a client computer during a backup is likely already stored in the central repository. It may already be in the central repository because it was backed up from the client computer during a previous backup and the data segment on the client computer has not been modified since then. It may also already be in the central repository because the data segment was previously backed up from another client computer having the same data segment.

When backing up a data segment from a client computer using deduplication, the backup server generates information that identifies the data segment. The backup server transmits this identifying information to the central repository and the central repository sends a response indicating whether it already contains the identified data segment. The backup server then transmits the actual data segment to the central repository only if the response indicated that the data segment is not already contained in the repository. As a result, the number of data segments transmitted to the central repository is reduced.

However, there is still a significant use of computing and network resources involved in the backup since the backup server transmits identifying information to the central repository for each data segment. Also, for each data segment, the central repository uses computing resources to generate a response, and the central repository transmits the response to the backup server. Therefore, there is a need in the art for a way to decrease the computing and network resources required for performing backups using deduplication.

BRIEF SUMMARY OF THE INVENTION

The above need is met by a system, method, and computer program product for backing up data from a backup source to a central repository using deduplication, where the data comprises source data segments. In one embodiment, a fingerprint cache comprising fingerprints of data segments stored in the central repository is received, where the data segments were previously backed up from the backup source. Source data fingerprints comprising fingerprints (e.g., hash values) of the source data segments are generated. The source data fingerprints are compared to the fingerprints in the fingerprint cache. The source data segments corresponding to fingerprints not in the fingerprint cache may not be currently stored in the central repository. After further queries to the central repository, one or more of the source data segments are sent to the central repository for storage responsive to comparison.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
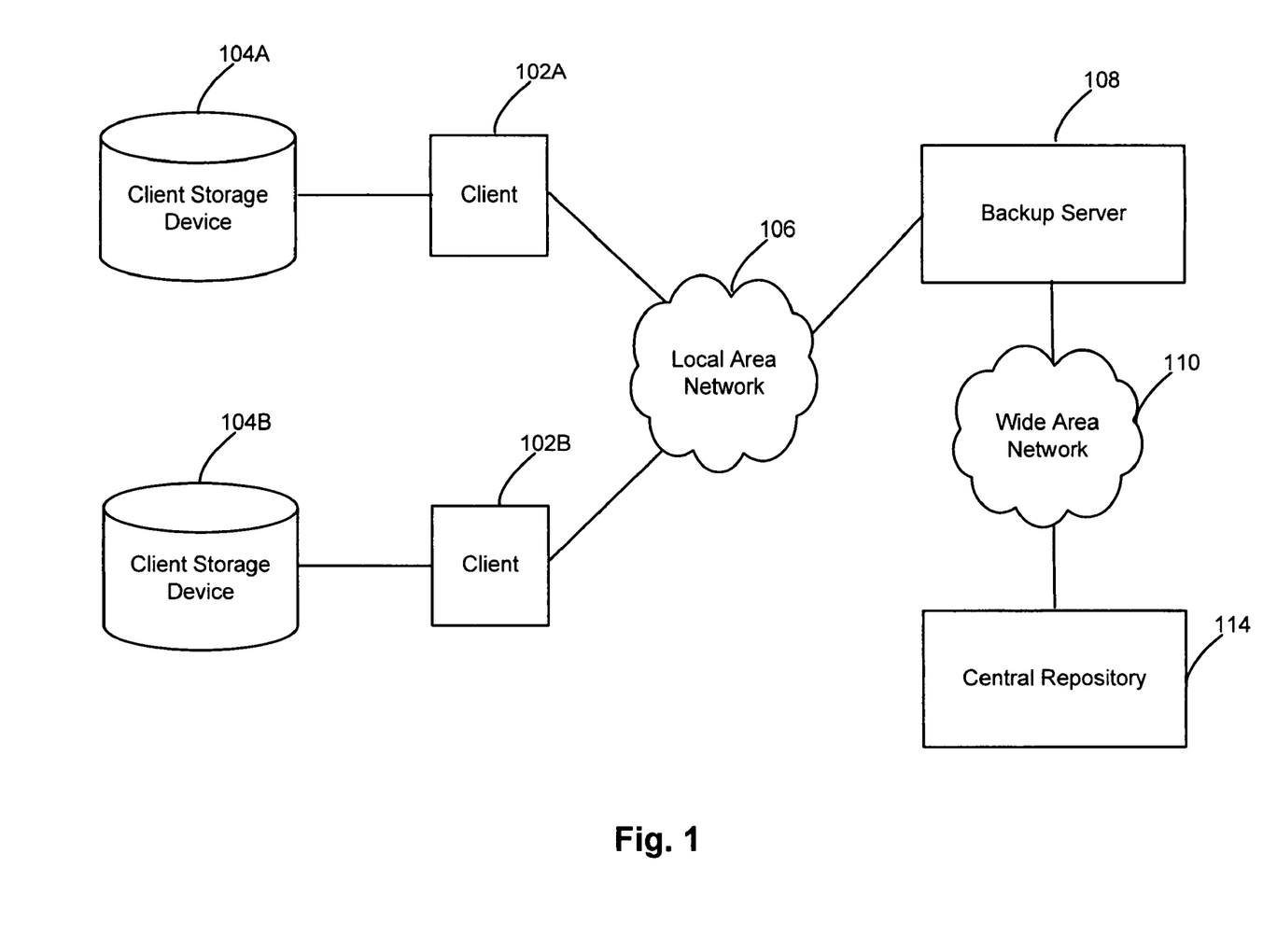
FIG. 1 is a high-level diagram illustrating a networked environment that includes a backup server and central repository for efficiently backing up clients using deduplication, in one embodiment.

FIG. 1 is a high-level diagram illustrating a networked environment that includes a backup server 108 and central repository 114 for efficiently backing up clients 102 using deduplication, in one embodiment. The backup server 108 and clients 102 are connected by a local area network 106. Although only two clients 102 are shown, there may be several on the network 106. The backup server 108 is also connected to a central repository 114 over a wide area network 110 such as the Internet. The local area network 106 allows for higher bandwidth and less expensive communications than the wide area network 110. In one embodiment, the backup server 108 and clients 102 are located in close physical proximity, while the central repository 114 is located elsewhere. In one embodiment, multiple backup servers 108 communicate with the central repository 114.

The clients 102 are various computing devices such as user workstations, servers (e.g., web or application servers), or routers on the local area network 106. These clients 102 have client storage devices 104, such as hard drives. In one embodiment (not shown), some client storage devices 104 are directly connected to the network 106. The client storage devices 104 contain data that may be stored as files in a file system. It is desirable to periodically back up the data from the client storage devices 104 to protect against data loss. Certain types of files, such as operating system files, rarely change over time and exist as identical copies on multiple client storage devices 104 in the environment. A client 102 or client storage device 104 is also referred to as a backup source.

The backup server 108 periodically (e.g., daily) performs various types of backups of data on the client storage devices 104. The data to be backed up from a particular client storage device 104 may be accessed as a stream, also referred to as a backup stream, by the backup server 108 over the local area network 106. This backup stream can be divided into data segments by the backup server 108, where a data segment corresponds to a file, a portion of a file, or a disk sector, for example. The backup server 108 employs deduplication techniques by sending data segments to the central repository 114 for storage if the segments are not already stored in the central repository. The backup server 108 does this by retrieving a fingerprint cache from the central repository 114 identifying data segments currently stored in the central repository that are likely to be encountered in the current backup stream. The backup server 108 uses this fingerprint cache to determine which data segments in the current backup stream should be sent to the central repository 114 without having to query the central repository regarding each data segment.

The central repository 114 stores copies of data segments received from the backup server 108 during a backup operation. The central repository 114 may store millions of data segments originally from thousands of client storage devices 104. The data segments stored in the central repository 114 are accessed in the event that it is necessary to restore backed up data to the client storage devices 104. Since the backup operation employs deduplication, a single data segment in the central repository 114 may currently exist on multiple client storage devices 104. To support the backup operation using deduplication, the central repository 114 provides information to the backup server 108 regarding which data segments are currently stored in the repository.

Figure 2:
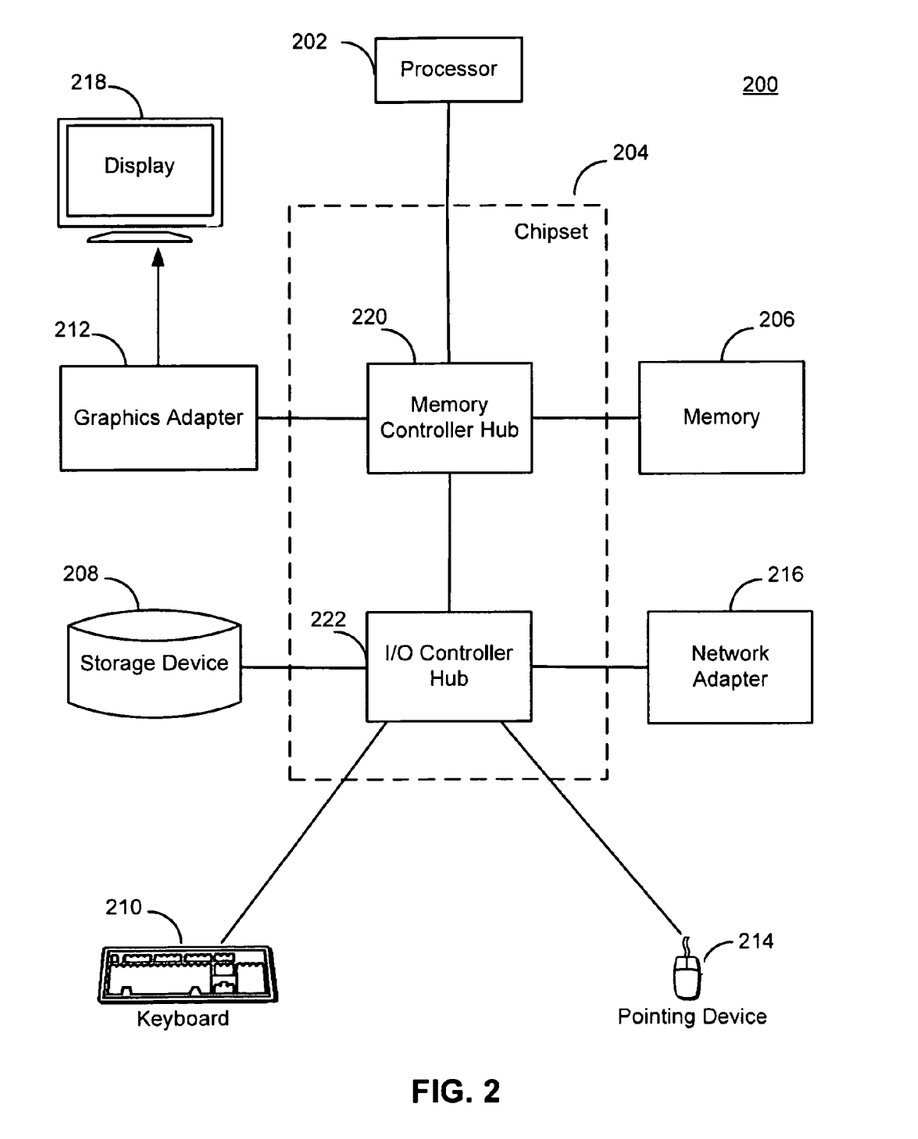
FIG. 2 is a block diagram illustrating a computer that can serve as an embodiment of a client, a backup server, or a central repository, in one embodiment.

FIG. 2 is a high-level block diagram of a computer 200 for acting as a client 102, a backup server 108, and/or a central repository 114 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. In one embodiment, the storage device 208 of a client 102 is a client storage device 104. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a backup server 108 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
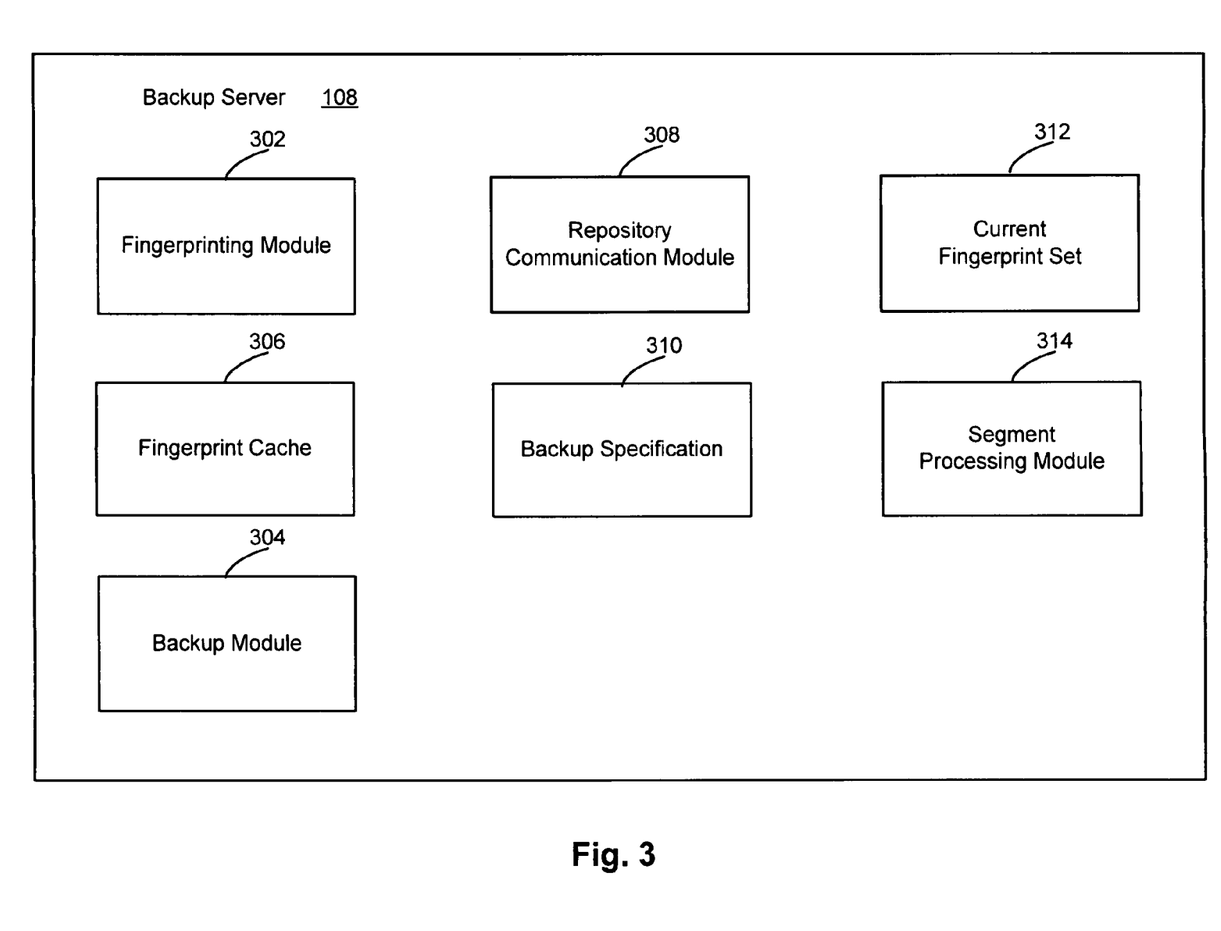
FIG. 3 illustrates a logical view of the backup server for backing up client storage devices, in one embodiment.

FIG. 3 illustrates a logical view of the backup server 108 for backing up client storage devices 104, in one embodiment. The backup server 108 performs backups based on backup specifications 310. A backup specification 310 includes an identification of the backup source, such as an Internet Protocol (IP) address or hostname of a client 102. The backup specification 310 may also include a backup type indicating whether the backup is a full or incremental backup. The backup specification 310 may also include a backup policy that specifies further details about the backup. The backup policy may indicate the types of files to be backed up (e.g., text files or non-executable files). It may indicate that files at certain locations in the file system (e.g., in certain directories) should be backed up. The backup policy may specify that the backup is to be a raw format backup (e.g., where data segments correspond to disk sectors rather than files).

The backup specifications 310 may be input to the backup server 108 by a system administrator and may be stored on the backup server. The backup server 108 may be configured to perform multiple backups according to multiple backup specifications 310 in order to back up multiple clients 102 and/or to perform different types of backups on a particular client. The backup server 108 may also be configured to perform backups according to each backup specification 310 with a specified frequency (e.g., daily). A backup specification 310 is also referred to as a source classification, since it classifies the source of backed up data.

The backup module 304 is configured to perform a backup using deduplication based on a backup specification 310, in one embodiment. The backup module 304 creates a backup stream from a client storage device 104, where the client storage device (or associated client 102) is the backup source identified in the backup specification 310. The backup module 304 segments the backup stream into data segments. The contents of the backup stream and the segmentation of the backup stream are based on the backup type and backup policy in the backup specification 310. The backup stream may be unbounded and comprise any amount of data and have any number of segments.

The fingerprinting module 302 creates a current fingerprint set 312 containing fingerprints of the data segments of the backup stream. A fingerprint of a data segment is a piece of data that uniquely identifies the data segment but that is significantly smaller than the data segment itself. In one embodiment, a fingerprint of a data segment is a value based on a hash of the contents of the data segment. A fingerprint can be generated from a data segment by applying a hash function, such as the Message-Digest algorithm 5 (MD5), to the data segment.

The repository communication module 308 requests a fingerprint cache from the central repository 114. The request includes the current backup specification 310, which may include the backup source, type, and policy. The central repository 114 may respond by providing a fingerprint cache 306 that is received by the repository communication module 308. All of the fingerprints in the fingerprint cache 306 correspond to data segments that are currently stored in the central repository 114.

The fingerprint cache 306 is a subset of the (possibly millions of) fingerprints stored on the central repository 114. The fingerprint cache 306 is chosen by the central repository 114 based on the current backup specification 310 as further discussed below in the description of the central repository. Briefly, the fingerprint cache 306 is chosen to contain fingerprints corresponding to data segments encountered in previous backups using the same or a similar backup specification 310 as in the current backup. As a result, the received fingerprint cache 306 is likely to correspond to the data segments in the current backup. If the backup specification 310 is unknown to the central repository 114, it may respond with an empty fingerprint cache 306.

The segment processing module 314 performs a comparison of the fingerprints in the current fingerprint set 312 and the fingerprint cache 306. If a fingerprint from the current fingerprint set 312 also appears in the fingerprint cache 306, then the data segment corresponding to the fingerprint is already stored in the central repository 114 and does not need to be sent there. The data segment may have been unchanged since a previous backup using the same backup specification (e.g., a file on a client storage device 104 that was unchanged since the last backup of the client storage device).

If a fingerprint from the current fingerprint set 312 does not appear in the fingerprint cache 306, it is still possible that the data segment corresponding to the fingerprint is already stored on the central repository 114. Though the data segment was not previously backed up using the current backup specification 310, it may have been previously backed up using a different backup specification (e.g., backed up from a different client storage device).

The segment processing module 314 causes the repository communication module 308 to send requests to the central repository 114 containing fingerprints from the current fingerprint set 312 that do not appear in the fingerprint cache 306. In one embodiment, a single request containing all of these fingerprints is sent to central repository 114 to reduce network bandwidth. The central repository 114 performs a search to determine whether it contains data segments corresponding to these fingerprints, regardless of the associated backup specification.

The central repository 114 sends a response (or responses) indicating which fingerprints correspond to data segments that are currently stored in the central repository. If the response indicates that a fingerprint is stored in the central repository, no further processing of that fingerprint is needed by the backup server 108. However, if the response indicates that a fingerprint is not stored in the central repository 114, the repository communication module 308 sends the data segment corresponding to the fingerprint to the central repository for storage.

As a result of using a fingerprint cache 306 for deduplication, usually only a relatively small number of requests regarding individual fingerprints is sent from the backup server 108 to the central repository 114. Often, the fingerprint cache 306 contains most of the fingerprints in the current fingerprint set 312. This is because, for a given backup specification 310 (e.g., a given client and backup type), the data segments comprising a backup typically do not change much from one backup to the next, particularly if backups are performed frequently. The backup server 108 as described above takes advantage of this backup history to reduce the number of fingerprint requests. Network bandwidth across the wide area network 110 may also be reduced. Using a fingerprint cache 306 may reduce the sending of requests regarding individual fingerprints to the central repository 114 and receiving of responses from the central repository. Additionally, processing resources on the backup server 108 and central repository 114 used for generating requests, responding to requests, and handling responses may be reduced.

If a fingerprint in the fingerprint cache 306 received from the central repository 114 is not in the current fingerprint set 312, then the fingerprint may correspond to a data segment that is no longer associated with the current backup specification 310. For example, a file may have been deleted from the client storage device 104 since the last backup of the client storage device. In one embodiment, the segment processing module 314 causes the repository communication module 308 to send a notification message to the central repository 114 identifying fingerprints in the fingerprint cache 306 that are not in the current fingerprint set 312. This message can be used by the central repository 114 to update its databases and to delete stored data segments that are no longer needed.

The fingerprinting module 302 does not necessarily create a current fingerprint set 312 containing fingerprints of all data segments in the backup stream before the fingerprints are compared to the fingerprints in the fingerprint cache 306. As mentioned above, the backup stream is unbounded and may have many data segments. A stream-based processing approach may be used where fingerprints of the data segments are created by the fingerprinting module 302 as the data segments are received from the client 102. These fingerprints can be passed to the segment processing module 314 as they are created for comparison against the fingerprint cache 306. Requests regarding specific fingerprints can be sent to the central repository 114 when needed. In one embodiment, a fingerprint cache 306 is received from the central repository 114 before the stream-based processing of data segments begins.

In one embodiment, a series of fingerprint caches 306 corresponding to a backup specification 310 are sent from the central repository 114 in response to a request for a fingerprint cache by the repository communication module 308. This may be done to limit the size of each fingerprint cache 306 sent to the backup server 108, which may have limited memory and processing resources. In this embodiment, a first fingerprint cache 306 may cover an initial portion of the backup stream (e.g., the first 10,000 data segments). Once the segment processing module 314 has processed the initial portion of the backup stream, a request can be sent to the central repository 114 for the next fingerprint cache in the series, and the next portion of the backup stream can be processed, and so forth.

In one embodiment, certain modules illustrated in FIG. 3 may be located on a client 102 instead of on the backup server 108. For example, the fingerprinting module 302 can be located on each client 102. In this case, the fingerprint set 312 is created on the client 102 and sent to the backup server 108 for further processing. In this embodiment, less data may be transmitted over the local area network 106 since fingerprints rather than actual data segments are transmitted. However, the local area network 106 is typically a high-bandwidth network where communication is inexpensive and therefore it is acceptable to transmit data segments over the network. In one embodiment, all of the components of backup server 108 are on a client 102. In this embodiment, the client 102 communicates directly with the central repository 114, and a separate backup server 108 is not used for the backup operation.

Figure 4:
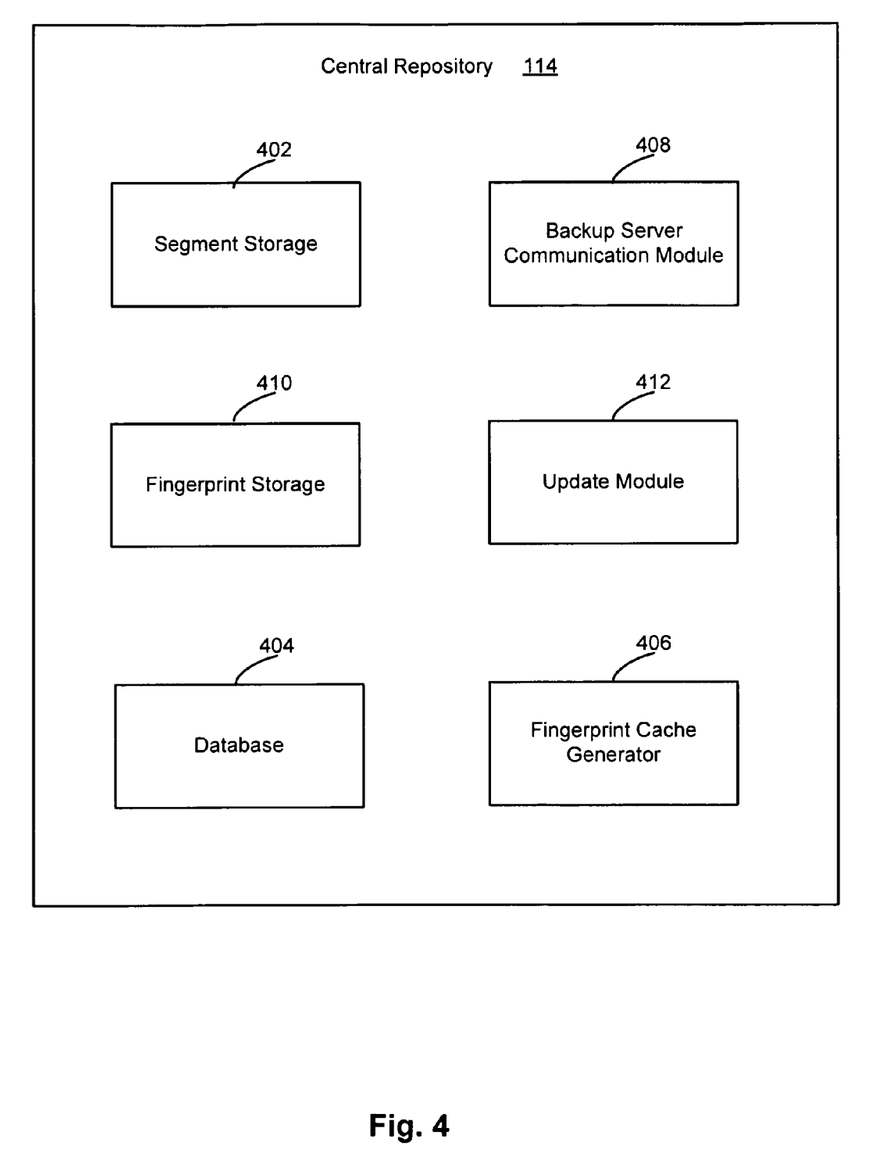
FIG. 4 illustrates a logical view of the central repository for storing backed up data segments from client storage devices, in one embodiment.

FIG. 4 illustrates a logical view of the central repository 114 for storing backed up data segments from client storage devices 104, in one embodiment. The segment storage 402 contains the backed up data segments and may comprise millions of data segments. The fingerprint storage 410 contains fingerprints corresponding to each of the segments in the segment storage 402.

In one embodiment, the database 404 includes indexes to data segments in segment storage 402 and to corresponding fingerprints in fingerprint storage 410 that enable queries based on backup specification parameters. For example, a query may include a particular backup source (e.g., a client hostname) with a particular backup type (e.g., full) and policy (e.g., non-executable files). The database 404 returns fingerprints and/or data segments associated with the backup specification 310. The database 404 is also able to efficiently determine whether a particular queried fingerprint is contained in the fingerprint storage 410. The database 404 may also maintain reference counts to each data segment and corresponding fingerprint indicating the number of client storage devices 104 currently having each data segment. If a reference count reaches zero, the data segment and fingerprint can be removed from segment storage 402 and fingerprint storage 410, respectively.

The backup server communication module 408 handles communications with the backup server 108. One type of communication is a request received from the backup server 108 for a fingerprint cache based on a backup specification 310. The backup server communication module 408 passes this request to the fingerprint cache generator 406.

The fingerprint cache generator 406 queries the database 404 with the parameters of the backup specification 310 to generate a set of fingerprints. The fingerprint cache generator 406 sends the set of fingerprints as the fingerprint cache 306 to the backup server communication module 408, which sends it to the backup server 108. In one embodiment, the fingerprint cache generator 406 creates a series of size-limited fingerprint caches 306 that are sent to the backup server as described above.

The query of the database 404 with the parameters of the backup specification 310 may result in no matches if a backup with a new backup specification is being performed. In this case, the fingerprint cache generator 406 can generate an empty fingerprint cache 306. In one embodiment, instead of returning an empty fingerprint cache 306, the fingerprint cache generator 406 initializes a new fingerprint cache containing fingerprints that are likely to be contained in the backup. A query of the database 404 can be performed using less than all of the parameters of the backup specification 310 or can be performed using different but similar parameters.

The backup server communication module 408 also handles requests from the backup server 108 for determining whether particular fingerprints are present in the central repository 114. The backup server communication module 408 can query the database 404 with the particular fingerprints and send the results to the backup server 108. Also, the backup server communication module 408 may pass the fingerprints to the update module 412 for updating the database 404. The backup server communication module 408 may also receive actual data segments from the backup server 108 if the backup server 108 determines that the data segments need to be added to the central repository 114. The backup server communication module 408 passes these data segments to the update module 412. Also, the backup server communication module 408 may receive from the backup server 108 a list of fingerprints that were present in a fingerprint cache 306 but were not in the current fingerprint set 312. The backup server communication module 408 passes these fingerprints to the update module 412.

The update module 412 updates the database 404, segment storage 402, and fingerprint storage 410 based on communications received from the backup server 108. These communications are passed to the update module 412 from the backup server communication module 408 as mentioned above. A request from the backup server 108 regarding the presence of specific fingerprints indicates that the particular fingerprints are not currently associated with the current backup specification 310 since they were not in the provided fingerprint cache 306. Some of the particular fingerprints may already be in the fingerprint storage 410 (with corresponding data segments in segment storage 402). For these fingerprints, the update module 412 updates the database 404 so that the fingerprints become associated with the parameters of the current backup specification 310 while retaining associations with parameters of backup specifications they are already associated with.

When the backup server 108 sends a data segment to the central repository 114 for storage, the update module 412 adds the segment to the segment storage 402 and adds a corresponding fingerprint to the fingerprint storage 410. This fingerprint may have been sent along with the data segment or may be generated by a fingerprinting module 302 in the central repository 114 (not shown). The update module 412 also updates the database 404 so that the current backup specification parameters reference the newly added data segment and fingerprint.

A message from the backup server 108 containing a list of fingerprints that were contained in the fingerprint cache 306 but were not found in data segments of the backup stream indicates that these fingerprints are no longer associated with the current backup specification 310. The update module 412 may remove the association between the current backup specification parameters and the indicated fingerprints in the database 404. This maintenance operation performed by the update module may beneficially prevent old fingerprints from being included in fingerprint caches.

The backup server 108 and central repository 114 may also contain modules for performing backup restore operations on the clients 102. These modules are not described here but may be implemented using techniques known in the art.

Figure 5:
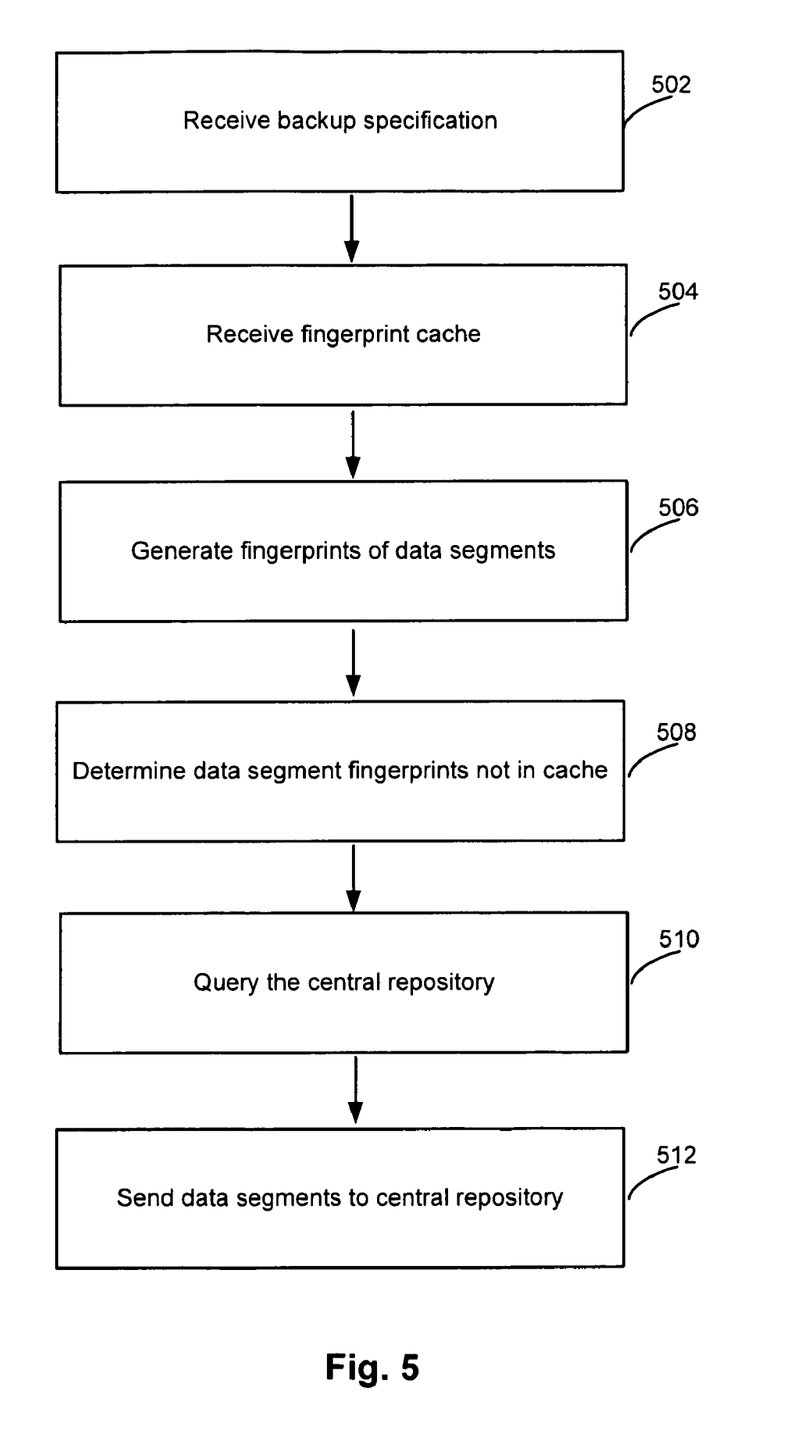
FIG. 5 is a flowchart illustrating a method for backing up data from a client storage device to a central repository using deduplication, in one embodiment.

FIG. 5 is a flowchart illustrating a method for backing up data from a client storage device 104 to a central repository 114 using deduplication, in one embodiment. A backup specification 310 is received 502 by the backup server 108. This backup specification 310 may have been created by a system administrator and may identify a backup source, backup type, and backup policy. The repository communication module 308 requests a fingerprint cache from the central repository 114 based on the backup specification 310. The central repository 114 responds and a fingerprint cache 306 is received 504. The backup module 304 initiates a backup stream from a client storage device 104 based on the backup specification 310, and the fingerprinting module 302 generates 506 fingerprints of data segments in the backup stream.

The fingerprints of the data segments are compared to fingerprints in the fingerprint cache 306 and the data segment fingerprints that are not found in the cache are determined 508. The repository communication module 308 queries 510 the central repository 114 regarding these data segment fingerprints by sending a request to the central repository. The central repository 114 responds to the request indicating which of the data segment fingerprints correspond to data segments already stored in the central repository. The backup server sends 512 the other data segments (i.e., the data segments not already stored in the central repository) to the central repository 114 for storage.

Figure 6:
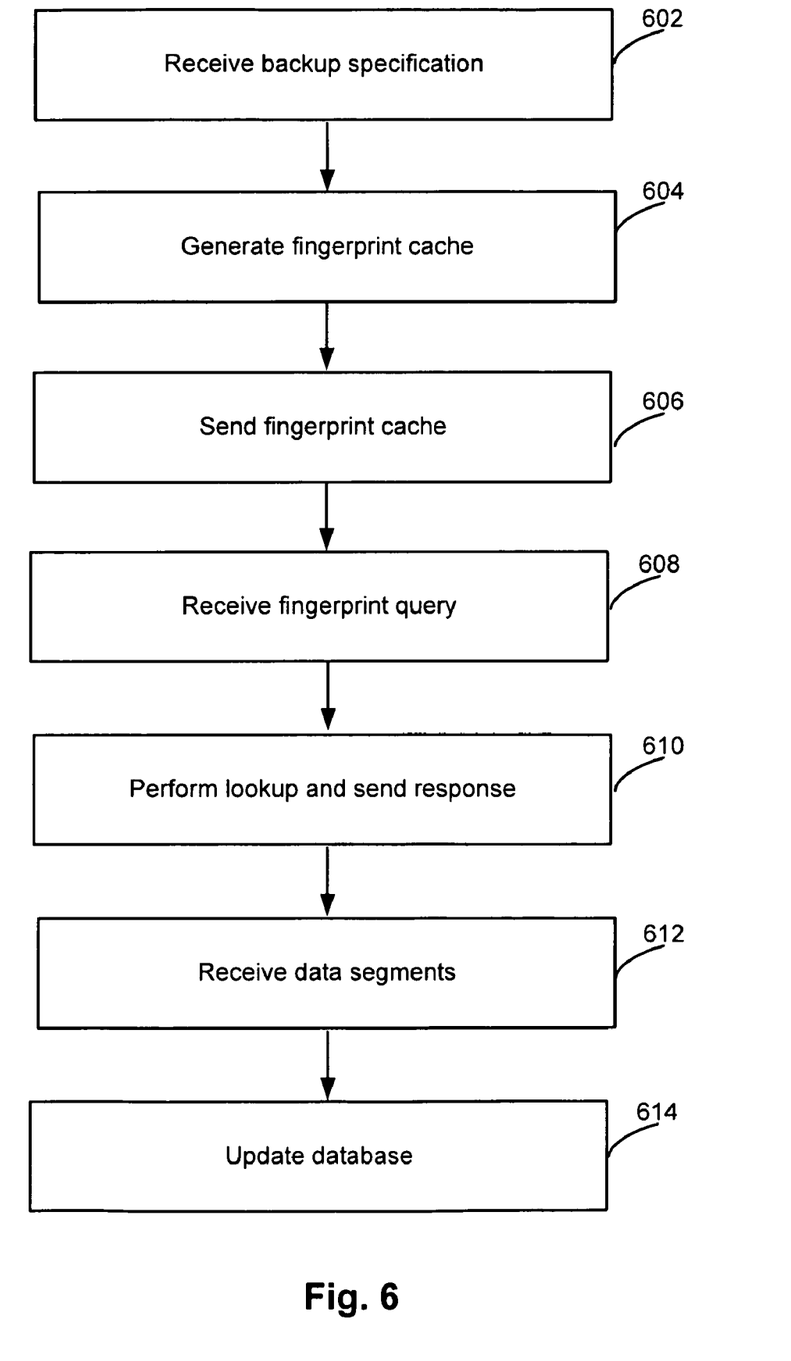
FIG. 6 is a flowchart illustrating a method for backing up data at a central repository using deduplication, in one embodiment.

FIG. 6 is a flowchart illustrating a method for backing up data at a central repository 114 using deduplication, in one embodiment. The central repository 114 receives 602 a backup specification from the backup server 108. The fingerprint cache generator 406 generates 604 a fingerprint cache 306 by querying the database 404 with parameters from the backup specification 310. The backup server communication module 408 sends 606 the fingerprint cache to the backup server 108. The backup server 108 processes the fingerprint cache 306 and sends queries regarding individual fingerprints that are received 608 by the central repository 114. The backup server communication module 408 performs 610 a lookup in the database 404 of the individual fingerprints and sends a response to the backup server 108. The backup server 108 processes the response and sends data segments to the central repository 114 that are received 612 and stored. The update module 412 updates 614 the database 404 based on the queries regarding individual fingerprints and the received data segments.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method for backing up data from a backup source to a central repository using deduplication, the data comprising source data segments, the method comprising:

receiving a backup specification having parameters identifying the backup source, a backup type, and a backup policy;

requesting a fingerprint cache from the central repository responsive to the parameters of the backup specification, the central repository adapted to generate the fingerprint cache by querying a database responsive to the parameters of the backup specification to generate a set of fingerprints associated with the backup specification and forming the fingerprint cache;

receiving the fingerprint cache comprising fingerprints of data segments stored in the central repository responsive to the request;

generating source data fingerprints comprising fingerprints of the source data segments;

storing the generated source data fingerprints comprising fingerprints of the source data segments;

comparing the source data fingerprints to the fingerprints in the fingerprint cache;

identifying a source data fingerprint from the compared source data fingerprints that does not match any fingerprints in the fingerprint cache;

querying the central repository with the identified source data fingerprint to determine whether a data segment corresponding to the identified source data fingerprint is stored in the central repository; and responsive to the data segment corresponding to the identified source data fingerprint not being stored in the central repository, sending the corresponding source data segment to the central repository for storage.

2. The computer-implemented method of claim 1, wherein a fingerprint of a data segment comprises a hash value of the data segment.

3. The computer-implemented method of claim 1, wherein a series of fingerprint caches are received, each of the series of fingerprint caches comprising a portion of the fingerprints of data segments associated with the backup specification, and wherein different portions of the source data fingerprints are compared to each of the series of fingerprint caches.

4. The computer-implemented method of claim 1, further comprising:

sending fingerprints in the fingerprint cache that are not found in the source data fingerprints to the central repository for updating the database of the central repository.

5. A computer system for backing up data from a backup source to a central repository using deduplication, the data comprising source data segments, the system comprising:

a non-transitory computer-readable storage medium storing executable computer program modules for:

receiving a backup specification having parameters identifying the backup source, a backup type, and a backup policy;

requesting a fingerprint cache from the central repository responsive to the parameters of the backup specification, the central repository adapted to generate the fingerprint cache by querying a database responsive to the parameters of the backup specification to generate a set of fingerprints associated with the backup specification and forming the fingerprint cache;

receiving the fingerprint cache comprising fingerprints of data segments stored in the central repository responsive to the request;

generating source data fingerprints comprising fingerprints of the source data segments;

storing the generated source data fingerprints comprising fingerprints of the source data segments;

comparing the source data fingerprints to the fingerprints in the fingerprint cache;

identifying a source data fingerprint from the compared source data fingerprints that does not match any fingerprints in the fingerprint cache;

querying the central repository with the identified source data fingerprint to determine whether a data segment corresponding to the identified source data fingerprint is stored in the central repository; and responsive to the data segment corresponding to the identified source data fingerprint not being stored in the central repository, sending the corresponding source data segment to the central repository for storage; and a processor for executing the computer program modules.

6. The computer system of claim 5, wherein a fingerprint of a data segment comprises a hash value of the data segment.

7. The computer system of claim 5, wherein a series of fingerprint caches are received, each of the series of fingerprint caches comprising a portion of the fingerprints of data segments associated with the backup specification, and wherein different portions of the source data fingerprints are compared to each of the series of fingerprint caches.

8. The computer system of claim 5, wherein the computer program modules are further configured for:

sending fingerprints in the fingerprint cache that are not found in the source data fingerprints to the central repository for updating a database of the central repository.

9. A computer program product having a non-transitory computer-readable storage medium having executable computer program instructions recorded thereon for backing up data from a backup source to a central repository using deduplication, the data comprising source data segments, the computer program instructions further configured for:

receiving a backup specification having parameters identifying the backup source, a backup type, and a backup policy;

requesting a fingerprint cache from the central repository responsive to the parameters of the backup specification, the central repository adapted to generate the fingerprint cache by querying a database responsive to the parameters of the backup specification to generate a set of fingerprints associated with the backup specification and forming the fingerprint cache;

receiving the fingerprint cache comprising fingerprints of data segments stored in the central repository responsive to the request;

generating source data fingerprints comprising fingerprints of the source data segments;

storing the generated source data fingerprints comprising fingerprints of the source data segments;

comparing the source data fingerprints to the fingerprints in the fingerprint cache;

identifying a source data fingerprint from the compared source data fingerprints that does not match any fingerprints in the fingerprint cache;

querying the central repository with the identified source data fingerprint to determine whether a data segment corresponding to the identified source data fingerprint is stored in the central repository; and responsive to the data segment corresponding to the identified source data fingerprint not being stored in the central repository, sending the corresponding source data segment to the central repository for storage.

10. The computer program product of claim 9, wherein a series of fingerprint caches are received, each of the series of fingerprint caches comprising a portion of the fingerprints of data segments associated with the backup specification, and wherein different portions of the source data fingerprints are compared to each of the series of fingerprint caches.

11. The computer program product of claim 9, wherein the computer program instructions are further configured for:

sending fingerprints in the fingerprint cache that are not found in the source data fingerprints to the central repository for updating a database of the central repository.

* * * * *